United States Patent [19]
Allen

[11] Patent Number: 5,491,810
[45] Date of Patent: Feb. 13, 1996

[54] METHOD AND SYSTEM FOR AUTOMATED DATA STORAGE SYSTEM SPACE ALLOCATION UTILIZING PRIORITIZED DATA SET PARAMETERS

[75] Inventor: Stevan C. Allen, San Jose, Calif.

[73] Assignee: International Business Machines Corporation, Armonk, N.Y.

[21] Appl. No.: 204,107

[22] Filed: Mar. 1, 1994

[51] Int. Cl.⁶ .................................................. G06F 12/08
[52] U.S. Cl. ........................ 395/444; 395/440; 395/449; 395/497.03; 395/600; 364/243.45; 364/254.6; 364/283.2
[58] Field of Search .............................. 364/200 MS File, 364/900 MS File; 395/449, 444, 440, 497.01, 497.02, 497.03, 600

[56] References Cited

U.S. PATENT DOCUMENTS

| | | | |
|---|---|---|---|
| 4,104,718 | 8/1978 | Poublan et al. | 395/600 |
| 4,437,155 | 3/1984 | Sawyer et al. | 395/463 |
| 4,489,378 | 12/1984 | Dixon et al. | 395/853 |
| 4,528,624 | 7/1985 | Kamionka et al. | 395/650 |
| 4,571,674 | 2/1986 | Hartung | 395/250 |
| 4,636,946 | 1/1987 | Hartung et al. | 395/463 |
| 4,638,424 | 1/1987 | Beglin et al. | 395/444 |
| 5,018,060 | 5/1991 | Gelb et al. | 395/600 |
| 5,353,430 | 10/1994 | Lautzenheiser | 395/444 |

*Primary Examiner*—Matthew Kim
*Attorney, Agent, or Firm*—Esther Klein; Craig J. Yudell; Andrew J. Dillon

[57] ABSTRACT

A method and system for automatically allocating space within a data storage system for multiple data sets which may include units of data, databases, files or objects. Each data set preferably includes a group of associated preference/requirement parameters which are arranged in a hierarchical order and then compared to corresponding data storage system characteristics for available devices. The data set preference/requirement parameters may include performance, size, availability, location, portability, share status and other attributes which affect data storage system selection. Data storage systems may include solid-state memory, disk drives, tape drives, and other peripheral storage systems. Data storage system characteristics may thus represent available space, cache, performance, portability, volatility, location, cost, fragmentation, and other characteristics which address user needs. The data set preference/requirement parameter hierarchy is established for each data set, listing each parameter from a "most important" parameter to a "least important" parameter. Each attempted storage of a data set will result in an analysis of all available data storage systems and the creation of a linked chain of available data storage systems representing an ordered sequence of preferred data storage systems. Data storage system selection is then performed utilizing this preference chain, which includes all candidate storage systems.

12 Claims, 9 Drawing Sheets

| LOCATION ⌐90 | CONCURRENT COPY ⌐92 | PERFORMANCE ⌐94 | CACHE ⌐96 | FREE SPACE ⌐98 |
|---|---|---|---|---|
| LOCAL | ENABLED | CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | NEXT CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | ETC | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | NOT ENABLED | CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | NEXT CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | ETC | ACTIVE | LARGEST |
| | | | | MEDIUM |
| | | | | SMALLEST |
| | | | NOT ACTIVE | LARGEST |
| | | | | MEDIUM |
| | | | | SMALLEST |

| LOCATION | CONCURRENT COPY | PERFORMANCE | CACHE | FREE SPACE |
|---|---|---|---|---|
| REMOTE | ENABLED | CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | NEXT CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | ETC | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | NOT ENABLED | CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | NEXT CLOSEST | ACTIVE | LARGEST |
| | | | | MEDIUM |
| | | | | SMALLEST |
| | | | NOT ACTIVE | LARGEST |
| | | | | MEDIUM |
| | | | | SMALLEST |
| | | ETC | ACTIVE | LARGEST |
| | | | | MEDIUM |
| | | | | SMALLEST |
| | | | NOT ACTIVE | LARGEST |
| | | | | MEDIUM |
| | | | | SMALLEST |

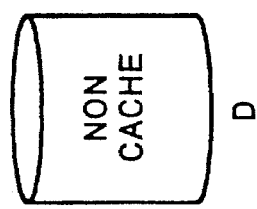 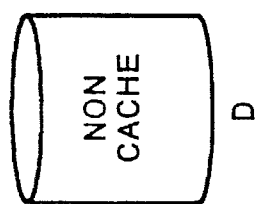
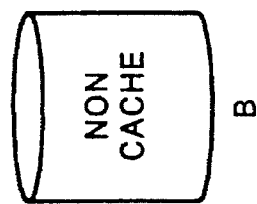 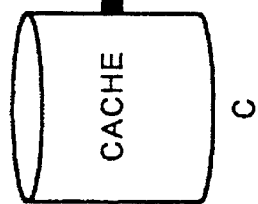 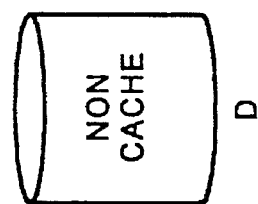
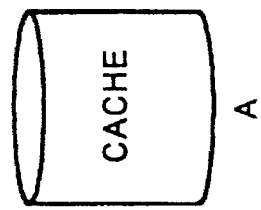 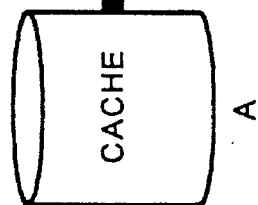 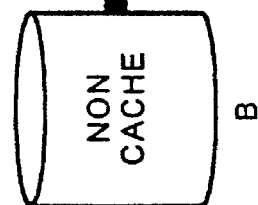
Fig. 5A
Fig. 5B
Fig. 5C

METHOD AND SYSTEM FOR AUTOMATED DATA STORAGE SYSTEM SPACE ALLOCATION UTILIZING PRIORITIZED DATA SET PARAMETERS

BACKGROUND OF THE INVENTION

1. Technical Field

The present invention relates in general to computer-controlled data storage systems and in particular to management of the selection of a particular device within a data storage subsystem. Still more particularly, the present invention relates to a method and system for automated data storage system space allocation within a data processing system utilizing a set of prioritized data set parameters.

2. Description of the Related Art

Initially, computer systems utilized a job control language (JCL) which required the computer user to specify many parameters of program execution, including specifications for peripheral data storage. Thus, each time the peripheral data storage was changed, a corresponding change was required in the JCL statements for the programs to be executed. One example of JCL control of a data processor is shown in U.S. Pat. No. 4,104,718, issued to Pobulan et al. This express interaction between the operation of a peripheral data storage system and user application programs represents an increasingly difficult aspect of computer programs due to the immensity of storage capacity which is available in modern information processing systems.

It would be desirable to allow a user or application programmer to issue specifications, preferably implicitly, for program execution and data storage requirements which are at a relatively high or "logical" level. The term "logical" as utilized herein refers to the specifications for desired program execution, particularly for peripheral data storage. It would also be desirable that all allocation and controls for peripheral data storage be removed from direct intervention by the application programmer. One example of an application of the "logical" level control of storage devices is illustrated in U.S. Pat. No. 4,403,288, issued to Christian et al., wherein one physical device was addressable as four separate logical devices.

The proliferation of direct access storage devices (DASD) within peripheral data storage subsystems has resulted in a centralized DASD storage space allocation program called "DADSM" (Direct Access Device Space Management). However, the application programmer still had to request space in terms of device parameters and types. An example of this technology may be seen in "Asynchronous Allocation Requests" Duvall et al., IBM Technical Disclosure Bulletin, Volume 235, No. 8, January 1983, pp. 4148–4150.

A virtual data storage system which employs a memory control processor which is external to the host processor which divides user-defined data sets into blocks of a size convenient for storage in peripheral data storage devices is illustrated in U.S. Pat. No. 4,467,421, issued to White. That system utilizes a memory processor to assign these blocks to storage locations on peripheral data storage devices. The memory processor intercepts the device oriented input/output commands from the host processor and adjusts operation of the peripheral data storage system to make it more efficient. This system still requires the application programmer to utilize JCL statements that are device dependent, even if an external memory processor interprets the device dependencies differently than intended by the application programming. While this arrangement may ease the affects of changing device types and the like, it still burdens the application programmer device parameter considerations.

U.S. Pat. No. 4,638,425, issued to Hartung, shows a cached direct access storage device (DASD) subsystem in which the application programmer may insert a storage parameter indication of whether certain data records may be stored primarily within volatile peripheral storage, or primarily retentively stored within direct access storage devices within the peripheral system. When stored primarily within cache, performance is enhanced; however, the application program is responsible for any lost data due to power problems or equipment failures. While the use indication provided within this system appears to operate on a relatively high "logical" level, it may be seen that the application programmer still is required to understand important operational characteristics of the peripheral data storage system.

U.S. Pat. No. 4,607,346, issued to Hill, teaches an implicit control of a peripheral DASD based upon the user or application programmer specifying "access densities" for a given program. Based upon such specified access densities, the data to be stored is directed to different portions of a DASD. From this description it may be seen that the application programmer must still be involved with the device parameters; however, the device parameter designations are complicated with the desired access parameters of the application program.

U.S. Pat. No. 4,528,624, issued to Kamionka et al., teaches the selection of peripheral devices for allocations prepatory to peripheral data storage based upon maximum free storage space within each device. This selection is independent of the actual storage capacity of the various devices. This is a simple but relatively effective selection process which may be machine executed after the application programmer has completed the device related JCL statement; i.e., the machine operations for data space allocations do not alleviate all of the interactions between the application programmer and device characteristics.

More recently, U.S. Pat. No. 5,018,060, issued to Gelb et al., teaches a technique whereby data storage space may be allocated within peripheral data storage devices utilizing implied allocation based upon user specified parameters. A plurality of data classes, storage classes and management classes are specified which each define predetermined characteristics of diverse units of data, predetermined sets of storage performance and availability requirements and life cycle attributes for units of data. A plurality of storage groups which each define diverse predetermined performance device and management characteristics within the data storage subsystem are also defined. Each received space allocation request is then matched utilizing these parameters with the data, storage, and management classes for assignment to one of each of those classes to the unit of data related to the allocation request.

While this system represents a substantial advance in the automation of data storage system space allocation, a storage device may be selected for utilization without regard to multiple parameters which may be associated with data classes unless each such parameter is satisfied. Failing to satisfy one or more parameters associated with the data will result in the assignment of that data to a device within a storage group merely based upon the availability of space within that device.

In view of the above, it should be apparent that a need exists for a method and system which removes the burden of data storage system selection from the application programmer and storage administrator and which results in improved efficiency and data management. It would also be desirable to increase data storage system utilization by providing a system which permits all data storage systems to be candidates for space allocation for each new data set by adding a completely logical control wherein the best currently available data storage system may be selected based upon an associated set of data set preferences and/or requirements.

SUMMARY OF THE INVENTION

It is therefore one object of the invention to provide an improved computer-controlled data storage system.

It is another object of the present invention to provide for automated management of the selection of a particular device within a data storage subsystem.

It is still another aspect of the present invention to provide an improved method and system for automated data storage system space allocation within a data processing system utilizing a set of prioritized data set parameters.

The foregoing objects are achieved as is now described. A method and system are disclosed for automatically allocating space within a data storage system for multiple data sets which may include units of data, databases, files or objects. Each data set preferably includes a group of associated preference/requirement parameters which are arranged in a hierarchical order and then compared to corresponding data storage system characteristics for available devices. The data set preference/requirement parameters may include performance, size, availability, location, portability, share status and other attributes which affect data storage system selection. Data storage systems may include solid-state memory, disk drives, tape drives, and other peripheral storage systems. Data storage system characteristics may thus represent available space, cache, performance, portability, volatility, location, cost, fragmentation, and other characteristics which address user needs. The data set preference/requirement parameter hierarchy is established for each data set, listing each parameter from a "most important" parameter to a "least important" parameter. Each attempted storage of a data set will result in an analysis of all available data storage systems and the creation of a linked chain of available data storage systems representing an ordered sequence of preferred data storage systems. Data storage system selection is then performed utilizing this preference chain, which includes all candidate storage systems.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A–4B is a pictorial representation of a hierarchical set of data-set parameters which may be utilized in accordance with the method and system of the present invention;

FIGS. 5A–C illustrate multiple linked preference chains of data storage devices which have been created in accordance with the method and system of the present invention;

DETAILED DESCRIPTION OF PREFERRED EMBODIMENT

Figure 1:
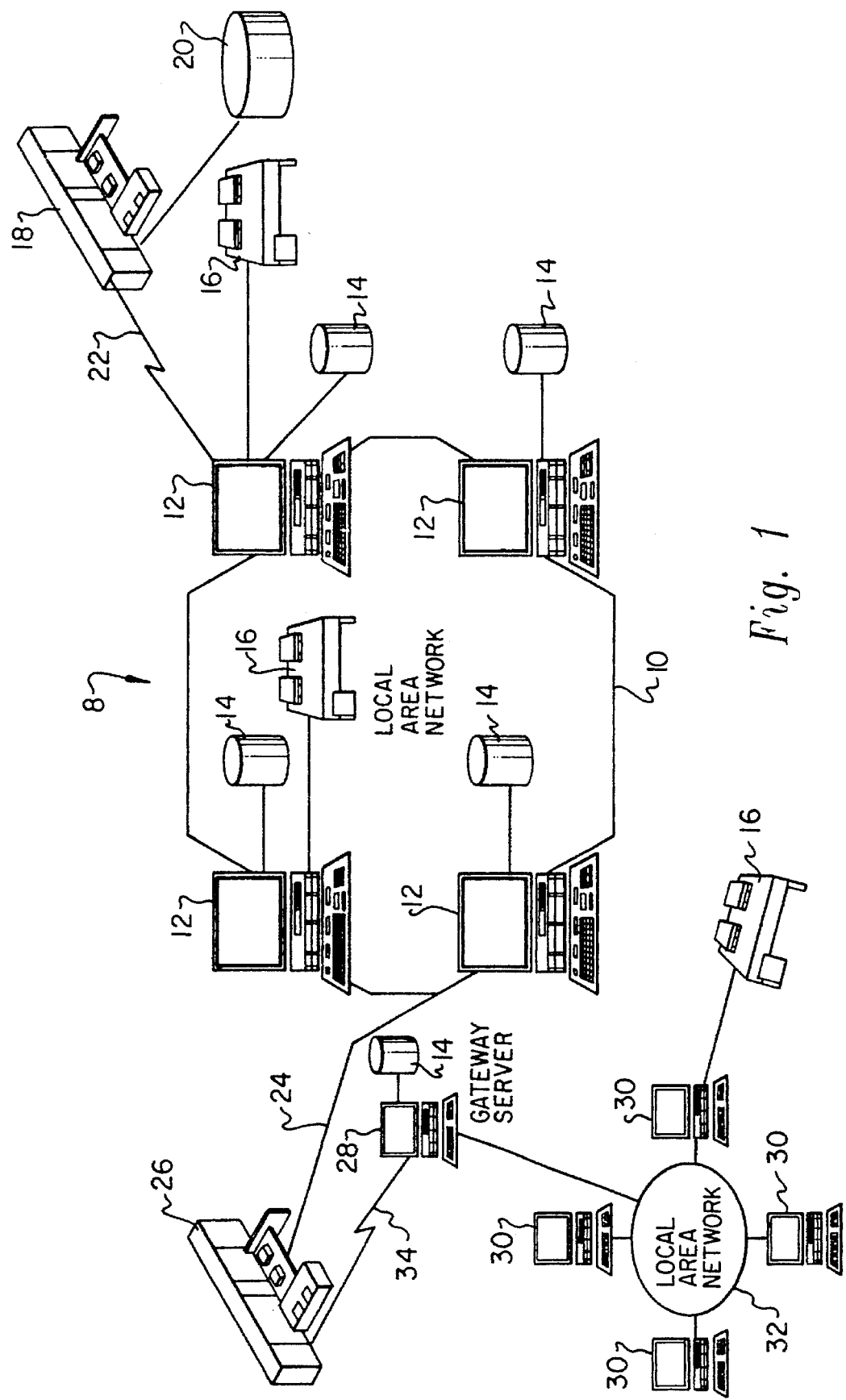
FIG. 1 is a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a peripheral data storage system 20 which may serve as remote storage for Local Area Network (LAN) 10. A second Local Area Network (LAN) 32 may be coupled to Local Area Network (LAN) 10 via communications controller 26 and communications rink 34 to a gateway server 28. Gateway server 28 is preferably an individual computer or Intelligent Work Station (IWS) which serves to link Local Area Network (LAN) 32, to Local Area Network (LAN) 10.

As discussed above with respect to Local Area Network (LAN) 32 and Local Area Network (LAN) 10, a plurality of data processing procedures or documents may be stored within peripheral data storage system 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to store or access a data object or document in another portion of data processing network 8. In view of the wide variety of such storage devices which may be available within distributed data processing system 8, and the diverse characteristics of those devices it should be apparent that a need exists for a method and system which allocates space within those storage devices in a manner which most closely matches the user's desires.

Figure 2:
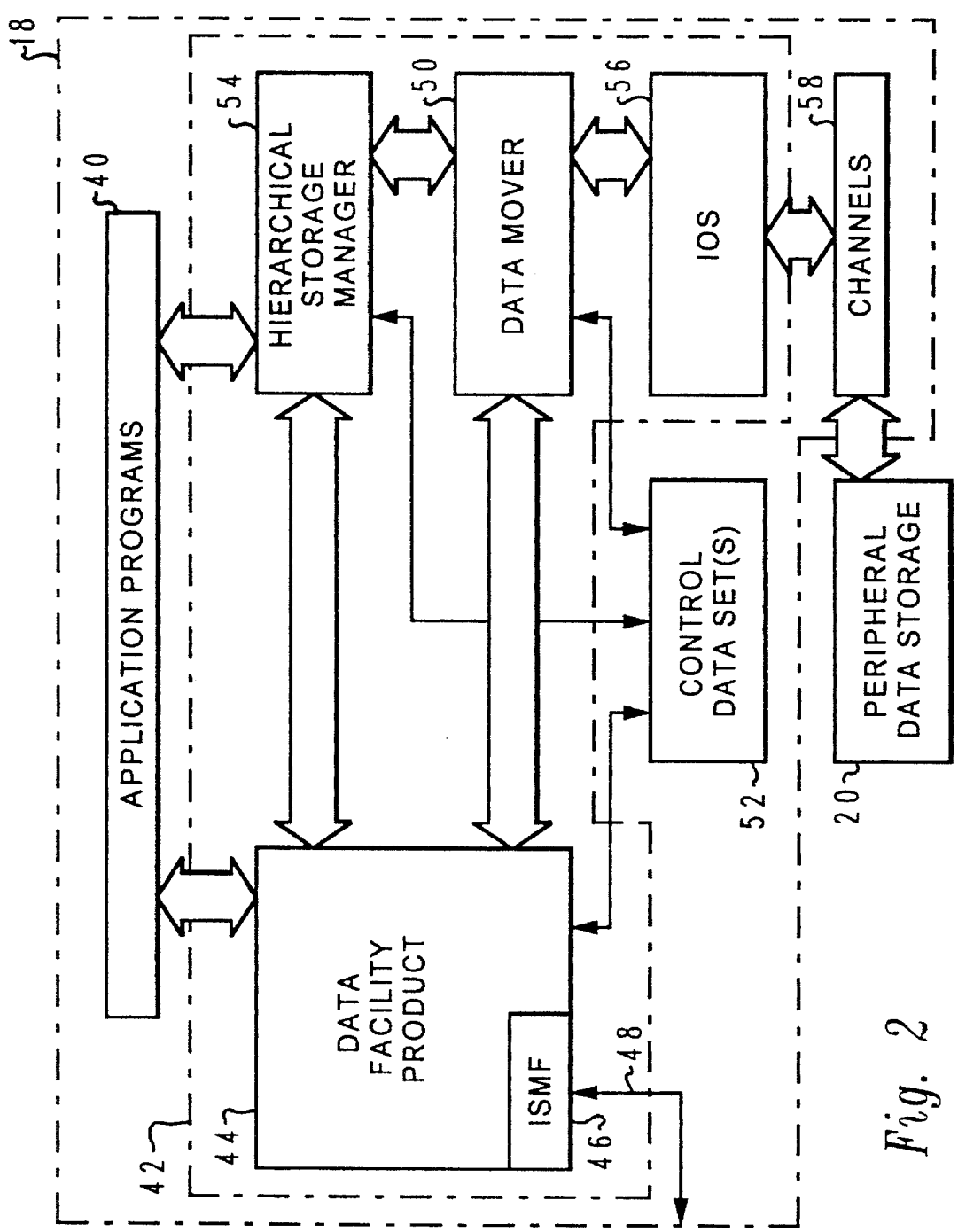
FIG. 2 is a simplified block diagram illustrating the relationships of application programs to peripheral data storage systems in accordance with the method and system of the present invention.

Referring now to FIG. 2, there is depicted a simplified block diagram illustrating the relationships of application programs to peripheral data storage systems in accordance with the method and system of the present invention. All objects depicted within FIG. 2, with the exception of peripheral data storage system 20, which is intended to include an entire storage subsystem, are contained within mainframe computer 18, as an example. A large plurality of application programs 40 execute within mainframe computer 18. Software connections to peripheral control programs 42 are provided in a manner well known to those having ordinary skill in the art. Data Facility Product (DFP) 44 includes programming which implements the present invention. A portion of DFP 44 includes ISMF 46, a terminal support program known to those having ordinary skill in the art which may be utilized for permitting mainframe computer 18 to operate with one or more terminals. Double-headed arrow 48 represents the connection to one or more terminals.

Data mover program 50 actually causes data movement between main memory (not shown) of mainframe computer 18 and peripheral data storage 20. Data mover 50 operates with IOS input Output System 56, a part of the operating system of mainframe computer 18 to effect transfer of data between the main memory (not shown) of mainframe computer 18 and peripheral data storage 20 via input output channels 58. Coordination of such peripheral operations is accomplished via control data sets (CDS) 52; most of which are known in the prior art; however, the new data structures utilizes for automatically allocating data system storage space in accordance with the present invention are illustrated within the flowchart formed by FIGS. 6A–6C. Operating in conjunction with DFP 44 is DFHSM 54, a hierarchical storage manager. DFHSM 54 provides for migration, recall, back up, etc. of data volumes.

Figure 3:
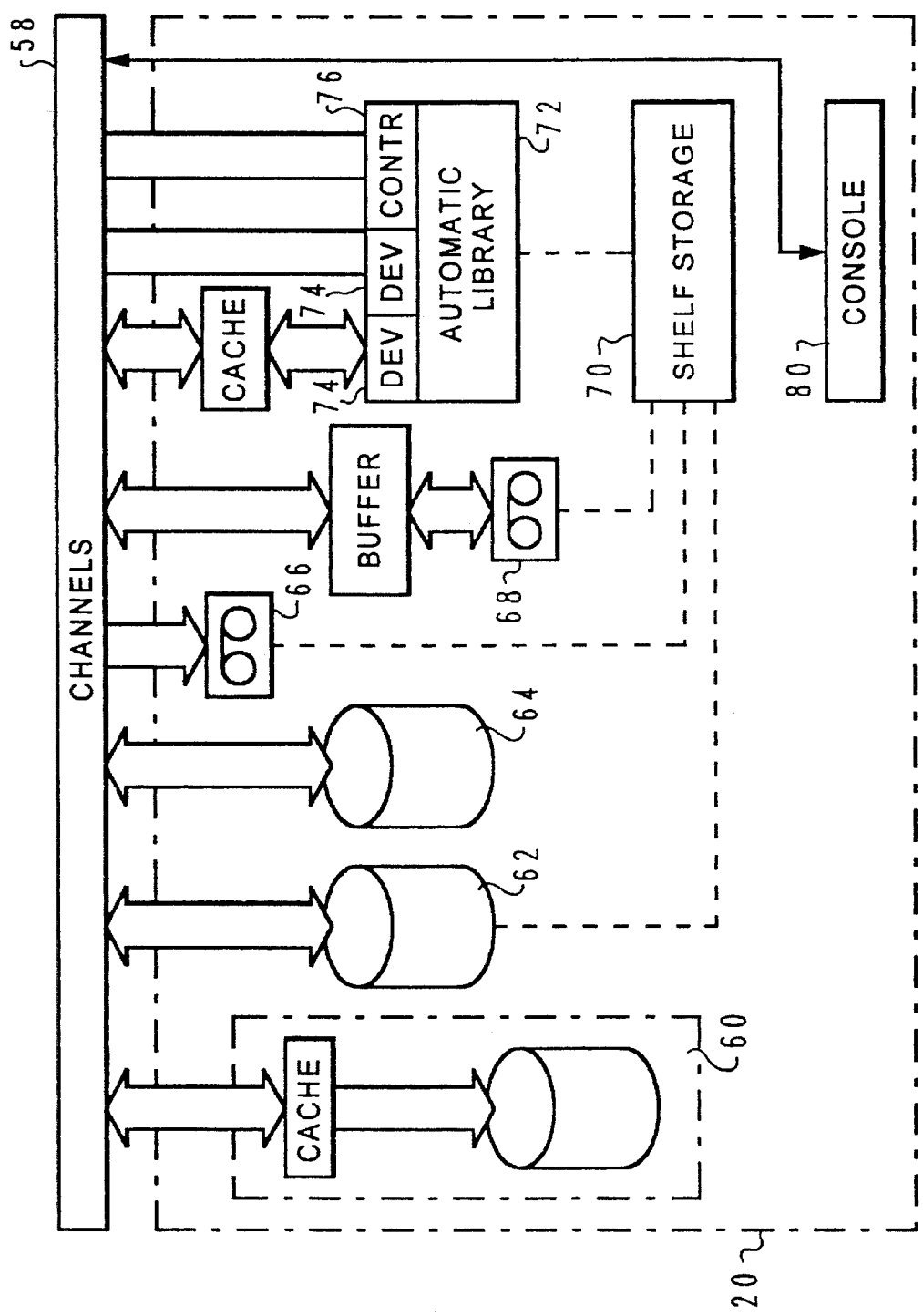
FIG. 3 is a simplified block diagram of a peripheral data storage system which may be utilized in accordance with the method and system of the present invention.

With reference now to FIG. 3, there is depicted a simplified block diagram of a peripheral data storage system which may be utilized in accordance with the method and system of the present invention. As illustrated within FIG. 2 above, peripheral data storage system 20 is attached to channels 58. A primary or level 0 number of hierarchical data storage includes cached DASD sub-system(s) 60 while level 1 of the hierarchy enclosed medium-performance DASD 62. High performance DASD may be a part of the primary level. Level 2 of the hierarchy may include directly connected tape subsystem(s) 66 or buffered tape subsystem(s) 68. A level 3 of the hierarchy includes shelf storage unit(s) 70. As is well known in the art, operators may hand carry tape reels, volumes, between storage unit(s) 70 and tape drives of tape subsystem(s) 66 and 68. An automatic data media library (tape or disk) 72 may also be included in peripheral data storage 20. Library 72 typically includes a media handling library portion and a plurality of recorders/readers (tape or disk) DEV 74 and a library control CONTR 76. Shelf storage unit(s) 70 are operatively associated with library 72. A storage console 80 is the terminal which is utilized to communicate with mainframe computer 18 for manual aspects of the peripheral data storage 20 and may be used as the terminal for ISMF 46. Library 72 may be a lower (higher numbered) level of the data storage hierarchy, the level being a matter of design choice.

Referring now to FIGS. 4A–4B, there is depicted a pictorial representation of a hierarchical set of data set parameters which may be utilized in accordance with the method and system of the present invention. As illustrated, the user or the system may select a plurality of data set parameters which, as described above, may include performance, size, availability, location, portability, share status and other attributes which affect data storage system selection. The example illustrated within FIGS. 4A and 4B include five data set parameters listed within columns 90, 92, 94, 96, and 98. Thus, in the ordered list of data set parameters illustrated within FIGS. 4A and 4B, the user or system has selected a location within column 90 as the highest priority parameter for data storage system space allocation for this particular data set. Next in importance is the ability of the data storage device to perform a "concurrent" copy, that is a specific type of backup copy capability. Thereafter, performance or speed of access, cache capability and finally the amount of free space within a particular storage device are listed as parameters to be considered in allocating space within a data storage system for this particular data set. Of course, those skilled in the art will appreciate that one or more of these parameters may represent requirements while the remaining parameters may represent preferences. Thus, the failure of a storage device to meet a required data set parameter will be cause for that data storage device to be rejected as a possible location for storage of this data set.

Still referring to FIGS. 4A and 4B, it may be seen that for this particular data set, the preferred allocation of space within a storage device will comprise a local storage device which is concurrent copy enabled, close to the required performance, having an active cache and the largest amount of free space. In the event a concurrent copy enabled storage device is not available locally, a device which is not concurrent copy enabled will be selected prior to selection of a remote storage device, upon a review of the hierarchical data set parameter listing contained within FIGS. 4A and 4B. Upon reference to these figures, those skilled in the art will appreciate that by generating a hierarchical list of data set parameters in the manner set forth within these figures, a user may specify multiple required or preferred characteristics for a data storage device which will be automatically considered prior to allocating space within the data storage subsystem for storage of this data set. Further, by specifying certain parameters as "optional" or as "preferences," the system may selectively allocate space within a storage device which meets an optimal subset of the data set parameters which have been considered in a hierarchical order specified by the user or the system.

With reference now to FIGS. 5A–5C, there are illustrated multiple linked preference chains of data storage devices which have been created in accordance with the method and system of the present invention. As illustrated within FIG. 5A, four separate storage devices are present within one or more data storage subsystems. Storage devices A, B, C, and D. As illustrated, storage devices A and C are cache enabled, while storage devices B and D are non-cache enabled. Thus, as illustrated within FIG. 5B, if the data set parameter associated with a particular data set indicates a preference for cache enabled storage, these four storage devices will be linked together in a preference chain in the manner depicted within FIG. 5B. That is, storage device A and storage device C are preferred over storage devices B and D. However, in the event the data set parameters associated with a particular data set specify a non-cache enabled requirement, the preference chain of data storage devices will be created in the manner set forth within FIG. 5C. That is, storage device B and D sense the non-cache enabled status is a requirement for this particular data set.

While the preference chains illustrated within FIGS. 5B and 5C represent the consideration of a single parameter (cache) those skilled in the art will appreciate that a preference chain may be created by analyzing the hierarchical data set parameter listing associated with each data set. Thus, the hierarchical data set parameter listing set forth within FIGS. 4A and 4B will result in a linked preference chain of data storage devices which meet all or some of the data set parameters from a most desirable data storage device to a least desired data storage device.

Figure 6A:
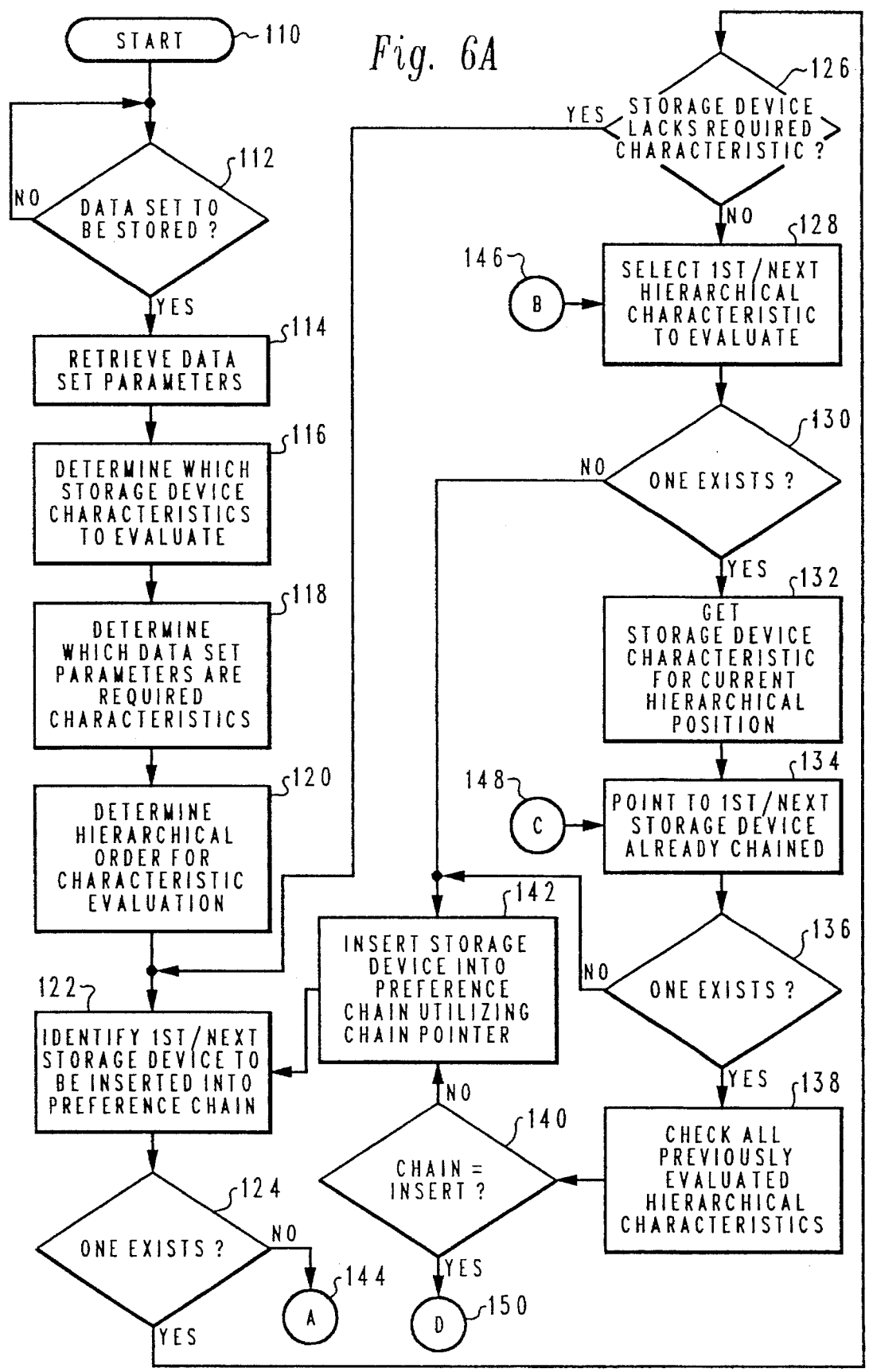
FIGS. 6A–C depict a high level logic flowchart which illustrates a method for implementing the present invention.
Figure 6B:
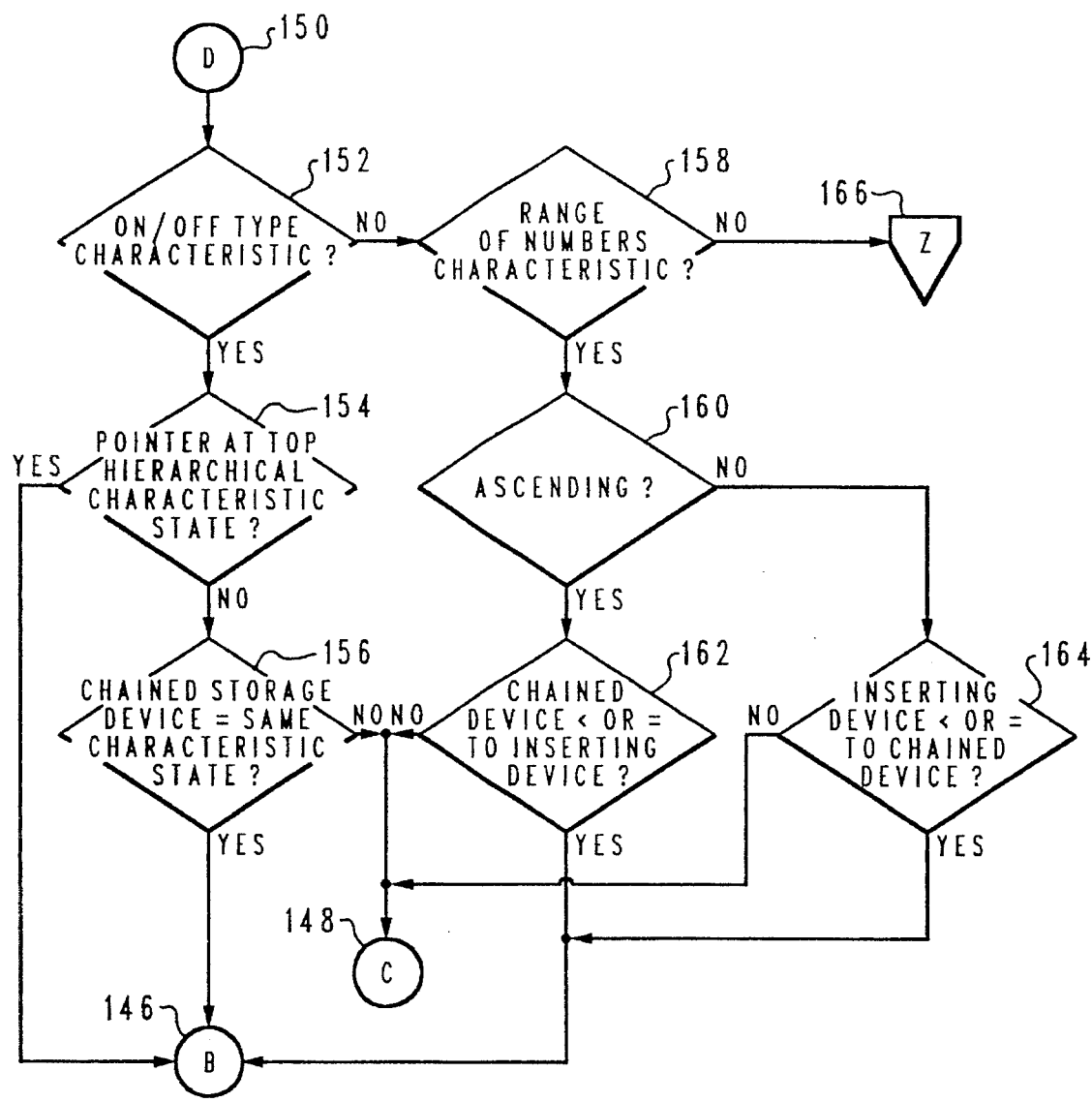
Figure 6C:
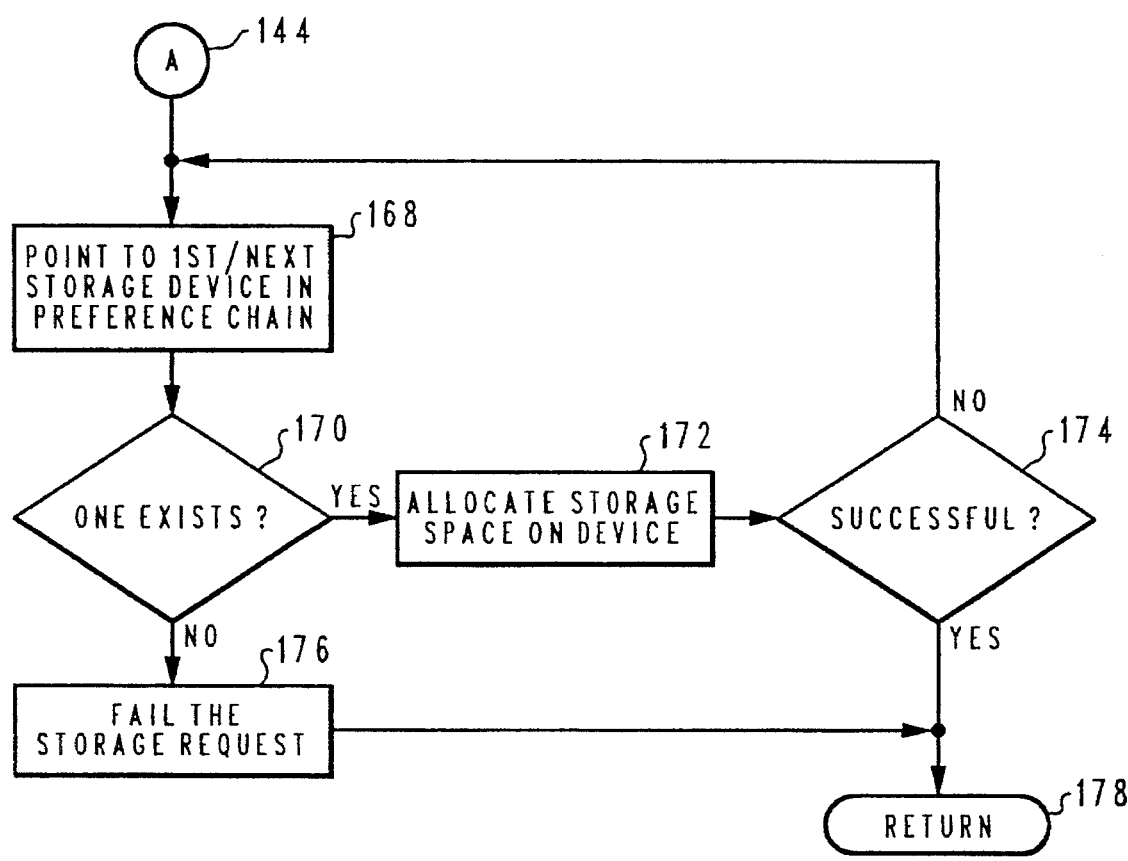

Referring now to FIGS. 6A–6C, when joined in the manner indicated, there is depicted a high level logic flowchart which illustrates a process for implementing the present invention within Data Facility Product (DFP) 44 (see FIG. 2). As illustrated, the process begins at block 110 and thereafter passes to block 112. Block 112 illustrates a determination of whether or not a data set is to be stored. If not, the process merely iterates until such time as a data set is ready to be stored.

Still referring to block 112, once a data set has been identified as a candidate for storage, block 114 illustrates the retrieval of tile associate preference/requirement parameters which are associated with that data set. Next, the process passes to block 116 to determine which storage device characteristics need to be evaluated for storage of this data set. As described above, each group of associated preference/requirement parameters which are associated with a data set may include performance, size, availability, location, portability, share status or other attributes which may affect data storage system selection. Data storage systems include various characteristics which reflect available space, cache, performance, portability, volatility, location, cost, fragmentation, and other characteristics. Thus, those skilled in the art will appreciate that those characteristics which identify a particular data storage device may comprise a more extensive list than may be specified for a particular data set. Thus, block 116 illustrates a determination of which storage device characteristics must be evaluated in order to determine whether or not those characteristics satisfy the limited set of associated preference/requirement parameters associated with a particular data set.

Next, referring to block 118, the process illustrates a determination of which data set parameters within the associated preference/requirement parameters for a particular data set are required characteristics. That is, characteristics which the candidate storage device must include in order to be a candidate for allocation of space for this data set. Thereafter, the process passes to block 120. Block 120 illustrates a determination of the hierarchical order for characteristic evaluation. Referring to FIGS. 4A and 4B, it may be seen that the method and system of the present invention utilizes an associated set of preference/requirement parameters for each data set which are arranged in a hierarchical order as selected by a user or the system. Thus, certain parameters are thought to be of greater importance than other parameters and the characteristics for each storage device must be evaluated in consideration of this hierarchical order.

Next, referring to block 122, the process of creating a preference chain of candidate storage devices is initiated. The first or next storage device to be inserted into the preference chain is identified. Thereafter, the process passes to block 124. Block 124 illustrates a determination of whether or not a storage device exists to be inserted into the preference chain and if so, the process passes to block 126. Block 126 illustrates a determination of whether or not that particular storage device lacks a required characteristic and if so, the process returns in an iterative fashion to block 122 to identify the next storage device to be considered for insertion into the preference chain.

Referring again to block 126, in the event the candidate storage device does not lack a required characteristic, the process passes to block 128. Block 128 illustrates the selection of the first or next hierarchical characteristic to evaluate. Thereafter, the process passes to block 130. Block 130 illustrates a determination of whether or not a hierarchical characteristic exists to be evaluated and if so, the process passes to block 132. Block 132 illustrates the retrieval of the storage device characteristic which corresponds to the current hierarchical position. Thereafter, the process passes to block 134.

Block 134 illustrates the pointing to the first or next storage device which is already present within the preference chain. Next, the process passes to block 136. Block 136 illustrates a determination of whether or not a storage device already exists within the preference chain and if so, the process passes to block 138. Block 138 illustrates the checking of all previously evaluated hierarchical characteristics and the process then passes to block 140.

Block 140 illustrates a determination of whether or not the currently evaluated characteristic is not equal to that characteristic within the preference chain (i.e., one is "Local" and one is "Remote"). If not, or, referring to blocks 130 and block 136, if a candidate storage device does not exist, the process passes to block 142. Block 142 illustrates the insertion of that storage device into the preference chain utilizing the preference chain pointer and the process then returns to block 122, in an iterative fashion, to identify the next storage device to be inserted into the preference chain.

Referring now to FIG. 6B, in the event the currently evaluated characteristic is equal to the characteristic in the previously processed device, the process passes, via connector 150, to block 152. Block 152 illustrates a determination of whether or not the characteristic under evaluation is an "ON/OFF" type characteristic. That is, a characteristic having two states. If so, the process passes to block 154. Block 154 illustrates a determination of whether or not the preference chain pointer is at the top hierarchical characteristic state for this particular characteristic. If so, the process returns, via connector 146 to block 128, in an iterative fashion, to select the next hierarchical characteristic to evaluate. In this manner, if the higher hierarchical characteristic state is the current state, differentiation between two storage devices must occur based upon an evaluation of the next hierarchical characteristic which corresponds to a parameter for that particular data set.

Still referring to block 154, in the event the preference chain pointer is not at the top hierarchical characteristic state, the process passes to block 156. Block 156 illustrates a determination of whether or not the chained storage device at the current point within the preference chain is the same characteristic state as the device under consideration. If so, the process again returns, via connector 146 to block 128 in an iterative fashion as described above. Alternately, if this condition is not true, the process passes via connector 148 to block 134, in an iterative fashion, to point to the next storage device within the preference chain.

Referring again to block 152, in the event the characteristic under consideration is not an "ON/OFF" type characteristic, the process passes to block 158. Block 158 illustrates a determination of whether or not the characteristic involves a range of numbers. For example, a data set may have specified as a preference for storage devices a speed of access. In such a circumstance, the process will pass from block 158 to block 160. Block 160 illustrates a determination of whether or not the preference chain includes these numbers in an ascending or descending format. If these numbers are listed within the preference chain in an ascending format, the process then passes to block 162 which illustrates a determination of whether or not the number for the currently chained device is less than or equal to the number for the inserting device. If so, the process returns to block 128 in an iterative fashion via connector 146. Alternately, in the event the number for the chained device is not less than or equal to the number for the inserting device, the process passes in an iterative fashion to block 134, via connector 148.

Referring again to block 160, in the event the range of numbers characteristic is listed within the preference chain in a descending manner, the process passes from block 160 to block 164. Block 164 illustrates a determination of whether or not the number for the inserting device is less than or equal to the number for the device already present within the preference chain. If so, the process returns to block 128 in an iterative fashion, via connector 146. Alternately, in the event the number for the inserting device is not less than or equal to the number for the device present within the preference chain, the process returns, in an iterative fashion, to block 134 via connector 148.

Referring again to block 158, in the event the characteristic under consideration is neither a "ON/OFF" type characteristic nor a range of numbers characteristic, the process passes to block 166. Block 166. Block 166 illustrates the concept that different types of characteristics may be associated with a data set. Block 166 is intended to illustrate the ability of the method and system of the present invention to accommodate the processing of as yet undetermined types of characteristics which may be associated with a data set and utilized to automate the allocation of space within a data storage system.

Referring to now to block 124 of FIG. 6A, in the event no more candidate devices exist to be inserted into the preference chain, the process passes from block 124 to block 168 within FIG. 6C via connector 146. Block 168 illustrates the pointing to the first or next storage device within the preference chain. Thereafter, the process passes to block 170. Block 170 illustrates a determination of whether or not a storage device exists within the preference chain which satisfies all, or an optimal subset of the hierarchical characteristics which correspond to the parameters associated with a particular data set. If so, the process passes to block 172. Block 172 illustrates the allocation of storage space on that device for the data set associated with those parameters and the process then passes to block 174. Block 174 illustrates a determination of whether or not the allocation of storage space on that device was successful and if not, the process returns, in an iterative fashion, to block 168 to select the next storage device within the preference chain. However, in the event the allocation of storage space was successful, the process passes to block 178 and returns.

Referring again to block 170, in the event no device exists within the preference chain which has been created by an evaluation of the data set parameters associated with a particular data set, the process passes to block 176. Block 176 illustrates the failing of the storage request and the process then passes to block 178 and returns.

Upon reference to the foregoing those skilled in the art will appreciate that the Applicant in the present application has created a method and system whereby a listing of requirement/preference parameters may be associated with each data set within the system and evaluated in a hierarchical manner in order to optimize the automated allocation of storage space within a data storage system in a data processing system. By hierarchically ordering the parameters associated with each data set and specifying those parameters as either "requirements" or "preferences," an optimal data storage device may be selected for storage of a data set which satisfies each of those characteristics, or, alternatively, satisfies an optimal number of those characteristics in the stated hierarchical order. In this manner, the allocation of storage space within a data storage system may be made more efficient by automating the process such that all storage devices within the system may be considered as candidates for each data set to be stored therein.

While the invention has been particularly shown and described with reference to a preferred embodiment, it will be understood by those skilled in the art that various changes in form and detail may be made therein without departing from the spirit and scope of the invention.

I claim:

1. A method in a data processing system for automated data storage system space allocation within a data storage system having a plurality of data storage devices, said method comprising the data processing system implemented steps of:

associating a listing of characteristics representing data storage device performance and availability parameters with each of said plurality of data storage devices;

associating a listing of data set parameters representing selectable data storage system characteristics with each of a plurality of data sets within said data processing system;

comparing a list of data set parameters associated with a particular data set with said listing of characteristics associated with each data storage device in a specified hierarchical order in response to an attempted storage of said particular data set;

automatically storing said particular data set within a first selected one of said plurality of data storage devices in response to a determination that said first selected one of said plurality of data storage devices satisfies said entire list of data set parameters; and automatically storing said particular data set within a second selected one of said plurality of data storage devices in response to a determination that no data storage device satisfies said entire list of data set parameters and a determination that said second selected one of said plurality of data storage devices satisfies an optimal subset of said list of data set parameters within said specified hierarchical order.

2. The method for automated data storage system space allocation within a data storage system according to claim 1, wherein said step of comparing a list of data set parameters associated with a particular data set with said listing of characteristics associated with each data storage device in a specified hierarchical order further comprises the step of creating a linked chain of available storage devices representing an ordered sequence of preferred data storage devices.

3. The method for automated data storage system space allocation within a data storage system according to claim 1, wherein said step of associating a listing of data set parameters representing selectable data storage system characteristics with each of a plurality of data sets within said data processing system comprises the step of associating a listing of data set parameters representing both required and preferred selectable data storage system characteristics with each of a plurality of data sets within said data processing system.

4. The method for automated data storage system space allocation within a data storage system according to claim 1, wherein said step of associating a listing of data set parameters representing selectable data storage system characteristics with each of a plurality of data sets within said data processing system includes the step of associating a parameter specifying a preferred data storage system performance characteristic with each of said plurality of data sets.

5. The method for automated data storage system space allocation within a data storage system according to claim 1, wherein said step of associating a listing of data set parameters representing selectable data storage system characteristics with each of a plurality of data sets within said data processing system includes the step of associating a parameter specifying a preferred data storage system size characteristic with each of said plurality of data sets.

6. The method for automated data storage system space allocation within a data storage system according to claim 1, wherein said step of associating a listing of data set parameters representing selectable data storage system characteristics with each of a plurality of data sets within said data processing system includes the step of associating a parameter specifying a preferred data storage system location characteristic each of said plurality of data sets.

7. A data processing system for enabling automated data storage system space allocation among a plurality of data storage devices within said data processing system, said data processing system comprising:

means for associating a listing of characteristics representing data storage device performance and availability parameters with each of said plurality of data storage devices;

means for associating a listing of data set parameters representing selectable data storage system characteristics with each of a plurality of data sets within said data processing system;

means for comparing a list of data set parameters associated with a particular data set with said listing of characteristics associated with each data storage device in a specified hierarchical order in response to an attempted storage or said particular data set;

means for automatically storing said particular data set within a first selected one of said plurality of data storage devices in response to a determination that said first selected one of said plurality of data storage devices satisfied said entire list of data set parameters; and means for automatically storing said particular data set within a second selected one of said plurality of data storage devices in response to a determination that no data storage device satisfies said entire list of data set parameters and a determination that said second selected one of said plurality of data storage devices satisfies an optimal subset of said list of data set parameters within said specified hierarchial order.

8. The system for automated data storage system space allocation within a data storage system according to claim 7, wherein said means for comparing a list of data set parameters associated with a particular data set with said listing of characteristics associated with each data storage device in a specified hierarchical order further comprises the step of creating a linked chain of available storage devices representing an ordered sequence of preferred data storage devices.

9. The system for automated data storage system space allocation within a data storage system according to claim 7, wherein said means for associating a listing of data set parameters representing selectable data storage system characteristics with each of a plurality of data sets within said data processing system comprises means for associating a listing of data set parameters representing both required and preferred selectable data storage system characteristics with each of a plurality of data sets within said data processing system.

10. The system for automated data storage system space allocation within a data storage system according to claim 7, wherein said means for associating a listing of data set parameters representing selectable data storage system characteristics with each of a plurality of data sets within said data processing system includes means for associating a parameter specifying a preferred data storage system performance characteristic with each of said plurality of data sets.

11. The system for automated data storage system space allocation within a data storage system according to claim 7, wherein said means for associating a listing of data set parameters representing selectable data storage system characteristics with each of a plurality of data sets within said data processing system includes means for associating a parameter specifying a preferred data storage system size characteristic with each of said plurality of data sets.

12. The system for automated data storage system space allocation within a data storage system according to claim 7, wherein said means for associating a listing of data set parameters representing selectable data storage system characteristics with each of a plurality of data sets within said data processing system includes means for associating a parameter specifying a preferred data storage system location characteristic each of said plurality of data sets.

* * * * *